(12) United States Patent
Noble et al.

(10) Patent No.: US 6,916,008 B2
(45) Date of Patent: *Jul. 12, 2005

(54) UNIVERSAL SAFETY COUPLER

(75) Inventors: Stuart O. Noble, Amherst, OH (US); Larry E. Strah, Concord, OH (US)

(73) Assignee: Hoke, Inc., Spartanburg, SC (US)

( * ) Notice: Subject to any disclaimer, the term of this patent is extended or adjusted under 35 U.S.C. 154(b) by 53 days.

This patent is subject to a terminal disclaimer.

(21) Appl. No.: 10/703,701

(22) Filed: Nov. 7, 2003

(65) Prior Publication Data

US 2004/0094738 A1 May 20, 2004

Related U.S. Application Data (63) Continuation of application No. 09/891,891, filed on Jun. 26, 2001, now Pat. No. 6,702,254.
(60) Provisional application No. 60/277,879, filed on Mar. 22, 2001.

(51) Int. Cl.[7] .......................... F16K 51/00; F16L 29/00; F16L 37/28
(52) U.S. Cl. .................................................. 251/149.6
(58) Field of Search ....................................... 251/149.6

(56) References Cited

U.S. PATENT DOCUMENTS

| | | |
|---|---|---|
| 1,965,692 A | 7/1934 | Dodge |
| 3,453,005 A | 7/1969 | Foults |
| 3,567,175 A | 3/1971 | Sciuto, Jr. |
| 4,060,219 A | 11/1977 | Crawford |
| 4,094,567 A | 6/1978 | Karcher et al. |
| 4,098,292 A | 7/1978 | Evans |
| 5,135,264 A | 8/1992 | Elliott-Moore |
| 5,211,197 A | 5/1993 | Marrison et al. |
| 5,294,092 A | 3/1994 | Wade et al. |
| 5,445,358 A | 8/1995 | Anderson |
| 5,535,985 A | 7/1996 | Larbuisson |
| 5,967,491 A | 10/1999 | Magnuson et al. |
| 6,237,631 B1 | 5/2001 | Giesler et al. |
| 6,354,564 B1 | 3/2002 | Van Scyoc et al. |
| 6,702,254 B2 * | 3/2004 | Noble et al. ............. 251/149.1 |

* cited by examiner

Primary Examiner—F. Daniel Lopez
Assistant Examiner—John K. Fristoe, Jr.
(74) Attorney, Agent, or Firm—Fay, Sharpe, Fagan, Minnich & McKee, LLP (57) ABSTRACT

A coupling system for selectively connecting an associated fluid inlet (I) with an associated fluid outlet includes an essentially hollow plug (90) having a shape corresponding to one of a plurality of plug types (90A, 90B, 90C) and that is in fluid communication with the associated fluid outlet. A coupler (1) is in fluid communication with the associated fluid inlet (I). The coupler (1) includes a receiving region (R) adapted for selective connection with a plug (90) having a shape corresponding to one of the plurality of plug types (90A, 90B, 90C). The coupler also has a lock (L) that selectively locks the plug (90) into the receiving region (R). The coupler additionally has a valve (V) that is movable between an open position defining an operative connection between the fluid inlet (I) and the fluid outlet whereby fluid flow (F) can pass from the inlet to the outlet, and a closed position defining an operative disconnection of the fluid inlet (I) from the fluid outlet.

14 Claims, 6 Drawing Sheets

UNIVERSAL SAFETY COUPLER

This application is a continuation of U.S. application Ser. No. 09/891,891, filed on Jun. 26, 2001, now U.S. Pat. No. 6,702,254, which in turn claims the benefit of U.S. Provisional Application No. 60/277,879, filed on Mar. 22, 2001.

BACKGROUND OF THE INVENTION

The present invention relates to fluid quick connect couplers and, more particularly, to hydraulic and pneumatic quick couplers that include features of universal couplers integrated together with features of safety couplers, in a novel universal safety coupler apparatus.

Conventional pneumatic quick coupling designs typically consist of two connecting members, including a plug member or "male" half and a socket member or "female" half. Usually, the socket member is connected to a source of pressurized fluid such as compressed air or the like. The plug member is selectively received into and locked with the socket member to complete a fluid circuit. Historically, the plugs have evolved into several "standard" configurations or profiles. Accordingly, many varieties of quick couplers have been designed, each being adapted for limited use with a different specific male plug configuration.

Several multiple interchange or "universal" couplers have been developed to accept various male plug profiles into a single specialized socket by the use of stationary and/or sliding seals or O-rings disposed in the socket. The seals or O-rings are configured to permit sealing two or more distinctly different types or styles of male plugs into a single common universal coupler. Such universal couplers are correspondingly more complex relative to couplers which are compatible with only a single male plug type.

For safety reasons and for other considerations, several types of non-universal couplers have been developed which, by means of secondary valving, allow for safe coupling and uncoupling between the respective members. These systems provide for the controlled discharge or exhaust of entrapped air to relieve applied fluid pressure between the coupler components. This style of coupler often incorporates a means of preventing accidental disconnect under pressure. Basic to this concept is the avoidance of "hose whip". These safety features have been accomplished in existing designs by means of one or more cylindrical sleeve arrangements incorporating various sleeve locking and interlocking devices often accomplished with ball bearings. Other air exhausting safety couplers use push-button camming arrangements to permit disconnection only after a controlled venting period. It is believed that incorporation of such safety features is mandated by law in many European countries and has become widely accepted domestically.

There remains an unfulfilled need, however, for an improved coupler which combines the features of universality, i.e. compatibility of a single female socket with various male plug types, together with effective safety features in a simple, practical, and integrated package. The present invention contemplates such a universal safety coupler improvement which overcomes the aforementioned limitations and others.

SUMMARY OF THE INVENTION

According to one aspect of the invention, a coupling system for selectively connecting an associated fluid inlet with an associated fluid outlet is disclosed. An essentially hollow plug having a shape corresponding to one of a plurality of plug types is in fluid communication with the associated fluid outlet. A coupler is in fluid communication with the associated fluid inlet. The coupler includes a receiving region adapted for selective connection with a plug having a shape corresponding to one of the plurality of plug types. The coupler also has a lock that selectively locks the plug into the receiving region. The coupler additionally has a valve that is movable between an open position defining an operative connection between the fluid inlet and the fluid outlet whereby fluid can pass from the inlet to the outlet, and a closed position defining an operative disconnection of the fluid inlet from the fluid outlet.

Preferably, the open position of the valve further includes an operative locked condition of the lock.

Preferably, the unlocked condition of the lock is conditional upon the closed position of the valve.

Preferably, the lock includes a plurality of holes, a plurality of locking balls disposed in the holes, a locking groove disposed on the plug, and a locking sleeve that in the locked position presses the locking balls into the locking groove. The open position of the valve advantageously includes a locked position of the locking sleeve. The lock preferably further includes a sleeve spring that biases the locking sleeve into the locked position, whereby the lock engages automatically in response to insertion of the plug into the receiving region.

Preferably, plug includes a plug nose, and the receiving region includes a valve, a valve seal that deforms to seal against the plug nose, and a valve spring that biases the valve seal and the valve against the plug nose whereby a predetermined range of plug nose lengths are accommodated.

Preferably, the closed position of the valve further includes an operative vent path that vents the receiving region.

According to another aspect of the invention, a coupler for detachably coupling with an associated plug to form a fluid flow coupling is disclosed. The coupler includes an inlet region. A receiving region is adapted for detachable receipt of the associated plug, said associated plug corresponding to one of a plurality of plug types each plug type having a type of plug nose and a type of locking groove. The receiving region also preferably has a plurality of openings, with a plurality of locking members arranged in the openings of the receiving region. The coupler also has a valve having an engaged position wherein the valve operatively connects the inlet region with the receiving region whereby a fluid path therebetween is defined, and a disengaged position wherein the inlet region is operatively disconnected whereby flow therefrom is blocked and wherein the receiving region is operatively vented. The coupler additionally has a lock having a locked position wherein the lock presses the locking members into the locking groove of the associated plug whereby the associated plug is locked into the receiving region, and an unlocked position conditional upon the valve being in the closed position wherein the locking members are unlocked from the locking groove of the associated plug.

The lock preferably also has a lock spring that biases the lock into the locked position whereby the lock automatically moves into the locked position responsive to insertion of the associated plug into the receiving region.

The receiving region preferably further includes an essentially rigid valve, a deformable valve seal that conforms to the plug nose whereby the plurality of plug nose types are accommodated, and a valve spring that compresses the valve and the valve seal against the plug nose whereby the plurality of plug nose lengths are accommodated.

The coupler preferably includes a plug interlock member that cooperates with the lock and the valve whereby the lock is prevented from moving into the unlocked position when the valve is in the engaged position.

The valve preferably includes an essentially cylindrical valve sleeve, a vent, an inlet valve conduit that operatively connects the inlet with the valve sleeve, and an outlet valve conduit that operatively connects the receiving region with the valve sleeve conditional upon the valve being in the engaged position, and that operatively connects the receiving region with the vent conditional upon the valve being in the disengaged position whereby the receiving region is vented.

The lock preferably includes an essentially cylindrical locking sleeve that in the locked position surrounds the locking members whereby the locking members are pressed into the locking groove of the associated plug.

According to yet another aspect of the invention, a coupler that couples a pressurized inlet to an associated plug is disclosed. A receiving region is adapted to receive the plug, said plug corresponding to one of a plurality of plug types each having a locking groove. A lock cooperates with the locking groove to selectively lock the plug into the receiving region. A valve has an open position wherein fluid flows from the pressurized inlet to the receiving region and a closed position wherein the pressurized inlet is isolated from the receiving region.

Preferably, a valve interlock maintains the valve in its closed position responsive to an unlocked condition of the lock. Advantageously, a latch interlock maintains the lock in an unlocked condition responsive to removal of a plug from the receiving region, said second interlock disengaging responsive to insertion of a plug into the receiving region whereby the inserted plug is selectively lockable.

Preferably, a plug interlock maintains the lock in its locked position responsive to an open condition of the valve.

Preferably, a vent path selectively vents the receiving region in response to a closing of the valve. The vent path is advantageously disposed in an area away from an associated user's hand whereby the vent path dispels the vented fluid away from the user's hand.

Preferably, the lock is an automatic lock that locks the plug into the receiving region responsive to insertion of the plug into said receiving region. The automatic lock optionally includes a spring biasing of the locking mechanism toward its locked position.

Preferably, the receiving region includes a spring biased valve that adapts to the plug length whereby the receiving region adapts to the lengths of the plurality of plug types.

Preferably, the receiving region includes a pliant valve seal that essentially conforms to the shape of the plug nose whereby the receiving region adapts to the shapes of the plurality of plug types.

The plurality of plug types preferably include at least two of: an industrial interchange type plug type, a Tru-Flate plug type, and an ARO plug type.

According to still yet another aspect of the invention, a universal safety coupler for coupling an associated plug to a fluid inlet includes a receiving area adapted to receive a plurality of plug types, a lock that cooperates with a groove of the associated plug to selectively lock the plug into the receiving area, a valve that selectively opens to enable fluid flow from the fluid inlet to the receiving area, a latch interlock that prevents the lock from locking without having a plug inserted into the receiving area, a valve interlock that prevents the valve from opening when the lock is unlocked, and a plug interlock that prevents the lock from unlocking when the valve is open.

A vent path is also preferably provided, that is operatively connected to the valve wherein closing the valve opens the vent path whereby the receiving region is vented.

One advantage of the present invention is that it is compatible with several types of male plugs.

Another advantage of the present invention is that it provides safety features including flow cutoff and downstream pressure exhaust in a universal-type coupler.

Yet another advantage of the present invention is that it provides quick-connect capability for multiple plug types without sacrificing safety features.

Still yet another advantage of the present invention is that it provides a pressure-side safety socket which is compatible with a plurality of male plug types.

Still further advantages and benefits of the present invention will become apparent to those of ordinary skill in the art upon reading the following detailed description of the preferred embodiment.

BRIEF DESCRIPTION OF THE DRAWINGS

The invention may take form in various components and arrangements of components, and in various steps and arrangements of steps. The drawings are only for the purpose of illustrating preferred embodiment and are not to be construed as limiting the invention.

DETAILED DESCRIPTION OF THE PREFERRED EMBODIMENT

The subject universal safety coupling will now be described functionally with reference to the schematic illustrations shown in FIGS. 1A and 1B. A coupler connects an inlet I to a receiving region R and a plug P. In the fully engaged/connected position of the coupler shown in FIG. 1A, a valve V is open so that a flow F passes from the inlet I to the plug P. The plug P is preferably mechanically locked into the receiving region R by a lock L operating in cooperation with a groove G formed in the plug P. The plug P is pneumatically connected with the inlet I through the valve V by the receiving region R. The receiving region R and the lock L are arranged in a manner that provides universality U whereby a plurality of standard plug shapes and dimensions are accommodated.

Figure 1A:
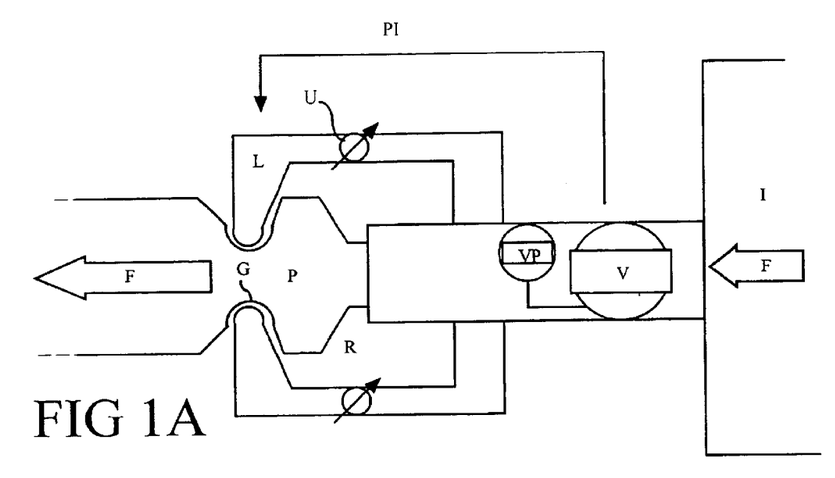
FIG. 1A is a schematic illustration of a coupling system in accordance with the invention shown with the coupling members in a fully engaged or connected condition.
Figure 1B:
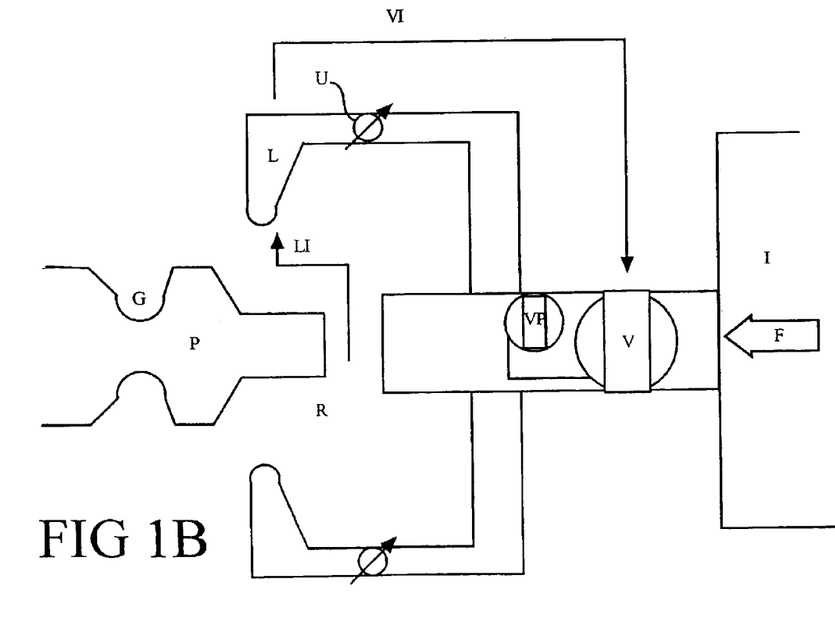
FIG. 1B is a schematic illustration of a coupling system in accordance with the invention shown with the coupling members in a disengaged or disconnected condition.

With continuing reference to FIG. 1A and with further reference to FIG. 1B, the coupler is shown in the disengaged/disconnected position. The safety function of the universal safety coupling are now described. In the engaged position of FIG. 1A, a plug interlock PI prevents the lock L from releasing the plug P while the valve V is open. This prevents hose whip and other undesirable and potentially dangerous events. In the disengaged position illustrated in FIG. 1B, a valve interlock VI prevents the valve V from opening while the lock L is disengaged or unlocked. A latch interlock LI prevents the lock from engaging or locking without a plug P being inserted into the receiving region R. The valve interlock VI and the latch interlock LI together prevent the open exhaust of the flow F from the inlet I. The two interlocks together assure safe coupling by requiring that the user first insert a plug P to enable the locking mechanism, and then engage the lock L with the plug P, prior to opening the valve V to apply fluid pressure.

Preferably, a vent path VP is provided to enable venting of the receiving region R, or the plug P that is inserted therein, to atmosphere at a selected suitable rate. The vent path VP is preferably operatively connected with the valve V such that opening the valve V closes the vent path VP, while closing the valve V opens the vent path VP and thereby vents any excess fluid prior to unlocking and disengaging the plug P.

Figure 2:
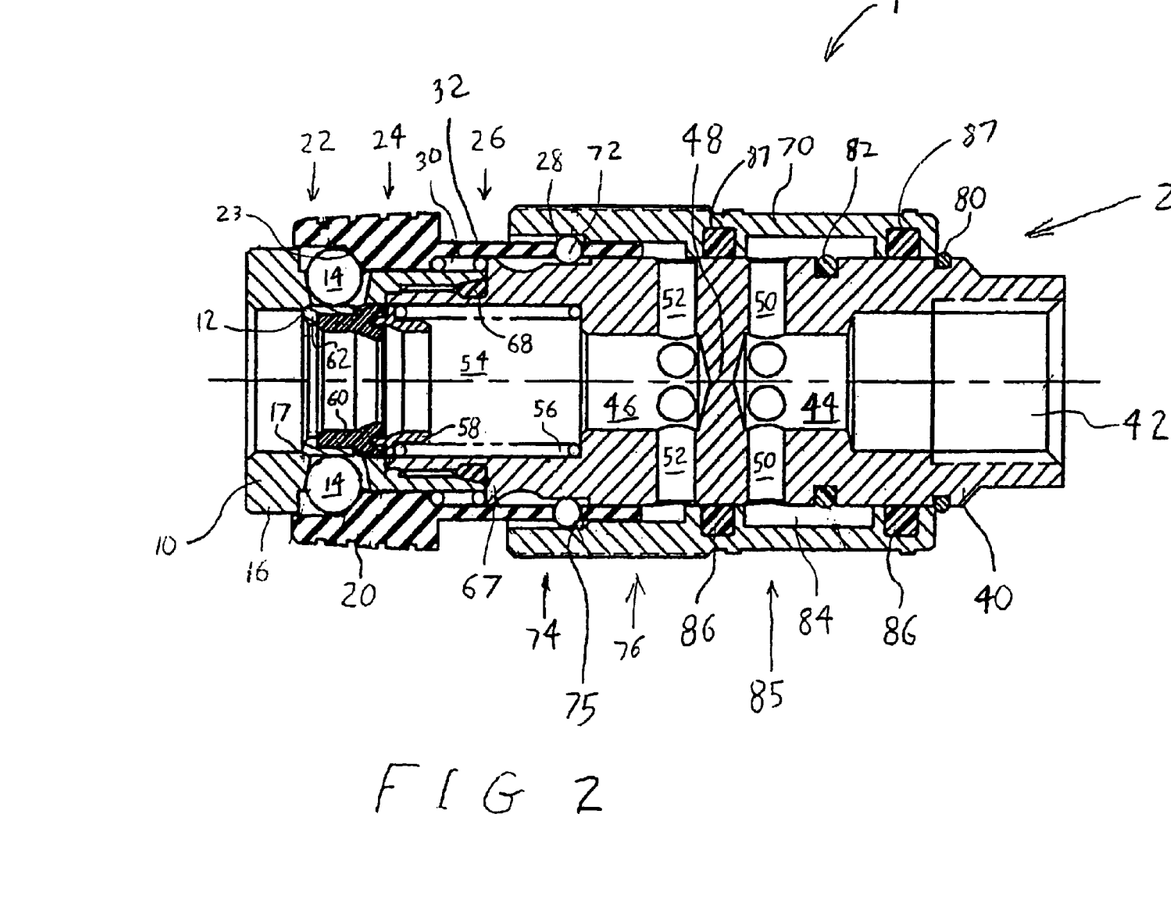
FIG. 2 is a cross-sectional view of the preferred embodiment of the subject coupler without a plug inserted therein.
Figure 3:
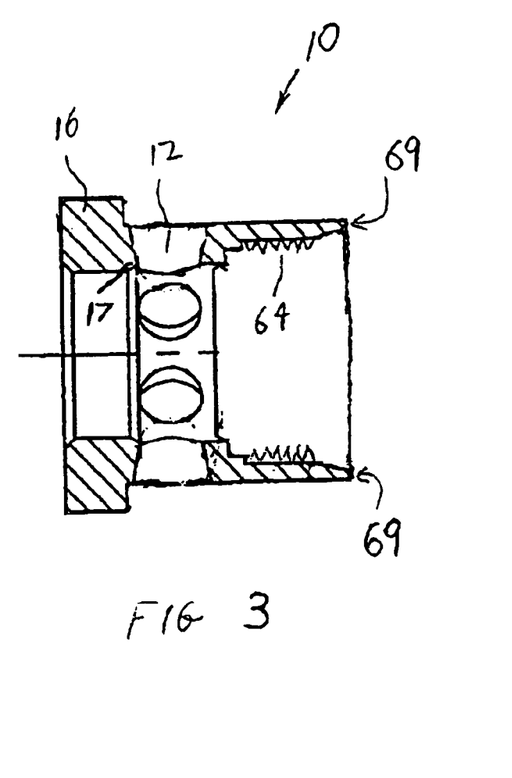
FIG. 3 is a cross-sectional view of the front body member of the coupler shown in FIG. 2.
Figure 4:
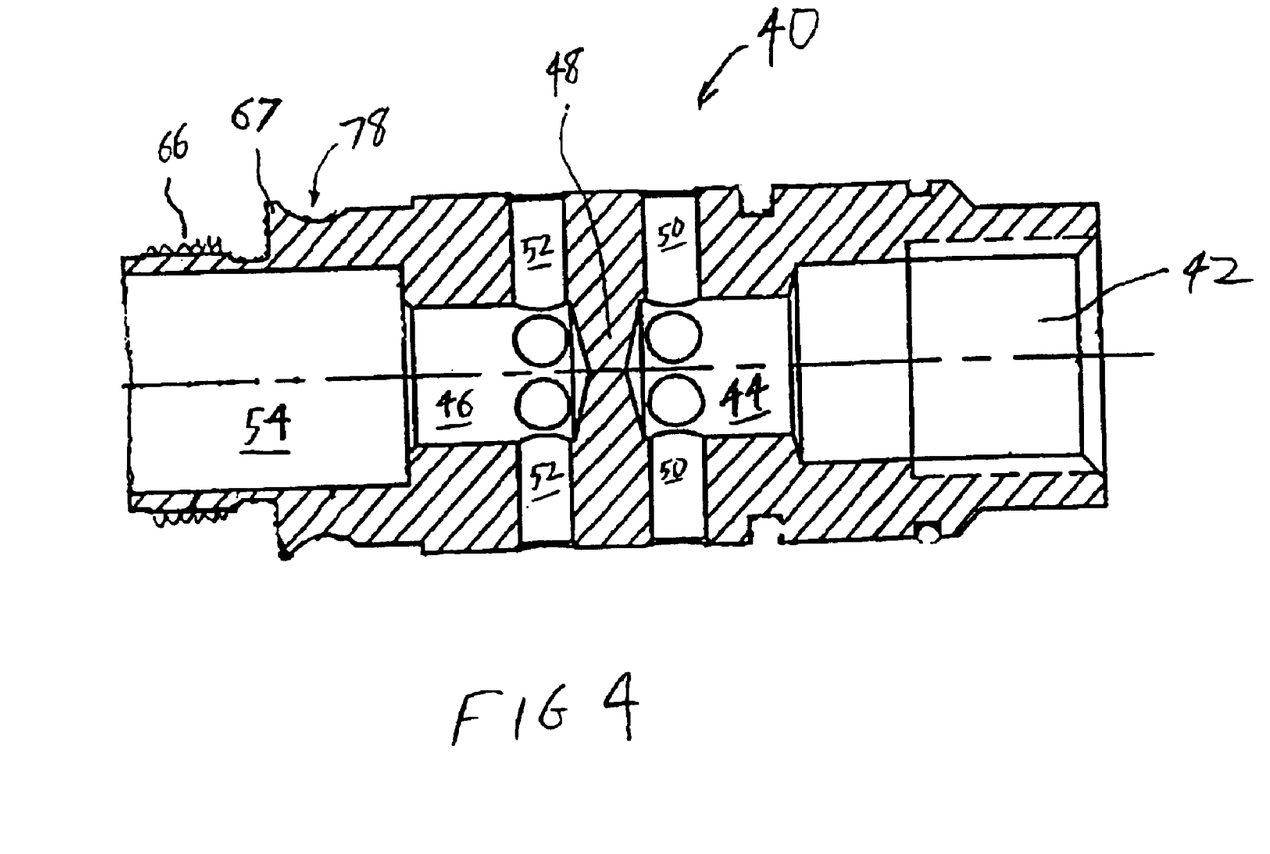
FIG. 4 is a cross-sectional view of the backnut body member of the coupler shown in FIG. 2.

With reference to FIGS. 2–5, the preferred embodiment of a coupler 1 that effectuates the coupling described with reference to FIGS. 1A and 1B will now be described. The coupler 1 includes an essentially hollow cylindrical main body 2 formed by a front body member 10 (FIG. 3) threadedly connected with a backnut body member 40 (FIG. 4). The front body member 10 defines a plurality of radially extending openings 12. The openings are preferably evenly arranged circumferentially and are adapted to loosely receive locking balls 14 inserted therein. The front body member 10 also defines an outwardly directed circular flange 16 at one end and a threaded region 64 on the other end. The front body member 10 is preferably an anodized aluminum component, but of course other materials, such as brass or steel, may be used as desired. The locking balls 14 preferably are comprised of a hard material such as stainless steel.

With continuing reference to FIG. 2 and with additional reference now to FIG. 4, the backnut body member 40 is substantially cylindrical in overall shape and is preferably formed of anodized aluminum. The backnut 40 defines an inlet region 42 adapted to receive a hose, pipe, or other fluid conductor (not shown) connected to an associated source of compressed fluid (not shown). In a preferred embodiment, the inlet region 42 is adapted to receive a ¼-inch hose. The connection is preferably by a standard threading arrangement, e.g. a ¼-18 NPTF female threading, although hose clamps, welds, or other connecting means are also contemplated.

The backnut body member 40 defines an internal inlet fluid conduit 44 and an internal receiving fluid conduit 46. The fluid conduits 44, 46 are operatively separated by a barrier region 48 which prevents fluid from passing directly from the inlet fluid conduit 44 to the receiving fluid conduit 46. The backnut also has a plurality of radially extending inlet valve conduits 50 which connect the central inlet fluid conduit 44 to the outside of the cylindrical backnut 40. A plurality of radially extending receiving valve conduits 52 similarly connect the receiving fluid conduit 46 to the outside of the cylindrical backnut 40.

The backnut body member 40 additionally defines a valve assembly region 54 adapted to receive a valve spring 56, a seal carrier 58, a valve seal 60, and a cylindrical valve cap 62 as best shown in FIG. 2. The seal carrier 58 is preferably formed of a metal or a hard plastic material, such as Celcon®. The valve seal 60 is preferably formed cylindrical in overall construction having the cross-sectional profile illustrated and is made of a softer material such as nitrile rubber. The valve seal 60 configuration enables a fluid tight connection between the subject socket and a wide range of associated plug sizes and shapes. The valve cap 62 is preferably formed of a brass or other metal component.

With continuing reference to FIGS. 2 to 4, the backnut body member 40 is preferably rigidly connected with the front body member 10 in a sealed manner. The connection establishes a fluid flow path without leakage. In the preferred embodiment illustrated, the rigid connection is a threaded joint obtained by cooperation of internal threads 64 (FIG. 3) provided on the front body member 10 with external threads 66 (FIG. 4) provided on the backnut 40. Preferably, a fluid-tight sealing of the connection is assured by a seal 68 which can be an O-ring, gasket, or any other form of packing member. In the assembled state of the backnut 40 with the front body member 10 shown in FIG. 2, a flange 67 formed on the backnut 40 abuts and tightens against the circular outer end 69 of the front body member 10.

Furthermore, in the assembled state illustrated in FIG. 2 and without a plug inserted, the seal carrier 58, the valve seal 60, and the valve cap 62 are urged against an inside surface 17 of the front body member 10 by the biasing force of the valve spring 56. In the extreme extended position of the valve as shown in FIG. 2, the outer surface of the valve cap 62 partially blocks the locking balls 14 and prevents them from retracting into the holes 12.

With continued reference to FIG. 2, a hollow cylindrical locking sleeve 20 slidably surrounds the front body 10 as shown. The locking sleeve 20 is also preferably an anodized aluminum component and has three sections. A first section 22 has a relatively large inner diameter that is adapted to slide over and around the flange 16 of the front body member 10. It is to be appreciated that in the position illustrated, in FIG. 2, prior to plug insertion, the valve cap 62 is in its forwardmost position partially blocking the locking balls 14. As a result, the locking sleeve 20 is limited in its forward motion and a surface 23 of the locking sleeve 20 formed at the junction of the first section 22 and a second section 24. The surface 23 abuts the locking balls 14 and prevents the locking sleeve 20 from further forward (to the left in FIG. 2) movement. It is to be appreciated that the diameter of the first portion 22 of the locking sleeve 20 is preferably sufficiently narrow to prevent the locking balls 14 from falling completely out of the assembly.

The second section 24, has an inner diameter which is smaller than the inner diameter of the first section 22. The second section 24 abuts the locking balls 14 at the surface 23 in the absence of an inserted plug, whereby the further movement of the locking sleeve 20 toward the flange 16 of the front body member 10 is prevented.

A third section 26 of the locking sleeve 20 has an inner diameter which is larger than the inner diameter of the second section 24. The third section 26 extends beyond the front body member 10 and over a portion of the backnut 40. The third section 26 is provided with a plurality of openings 28 in the extension beyond the main body 10 which are adapted to receive a set of interlock balls 72. The front body member 10 and the third section 26 of the locking sleeve 20 together define an annular space 30 which receives a sleeve spring 32.

In the assembled state, the sleeve spring 32 is held in compression between the flange 67 of the backnut 40 and the second portion 24 of the locking sleeve 20 whereby the locking sleeve 20 is biased toward the flange 16 of the main body 10. However, the sleeve spring 32 is preferably sufficiently pliant to permit selective manual sliding of the locking sleeve 20 in the direction away from the flange 16.

Figure 5:
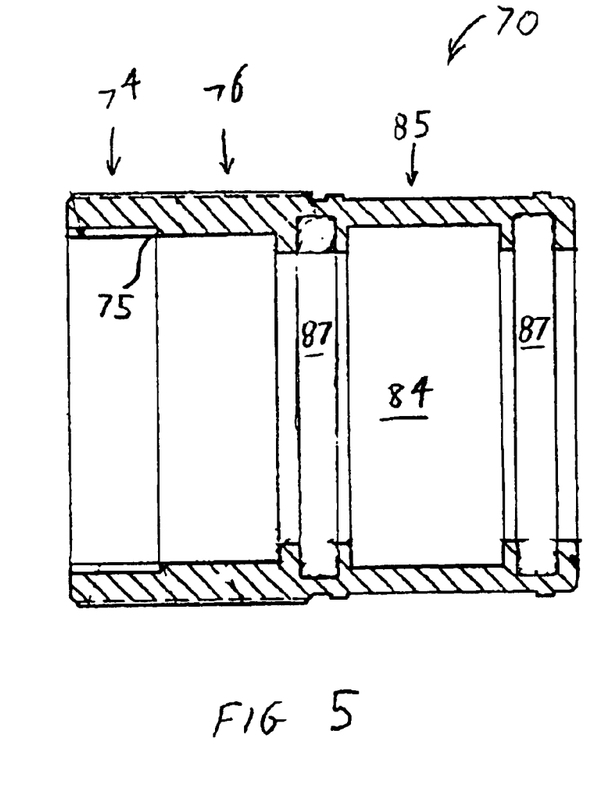
FIG. 5 is a cross-sectional view of the sliding valve sleeve of the coupler shown in FIG. 2.

With continuing reference to FIGS. 2–4, and with additional reference now to FIG. 5, the coupler 1 also includes an essentially cylindrical sliding valve sleeve 70, preferably formed of anodized aluminum. The valve sleeve 70 is inserted over the inlet region 42 of the backnut 40 and is slidably carried on the assembled main body 2 formed by the backnut 40 and the front body member 10. The valve sleeve 70 also surrounds a portion of the third region 26 of the locking sleeve 20. The valve sleeve 70 includes a first portion 74. In the assembled state with no plug inserted, the first portion 74 surrounds the interlock balls 72. The valve sleeve 70 has a second portion 76 with a smaller inner diameter versus the first portion.

Because of the reduced diameter of the second section 76, in the assembled state with no plug inserted, a surface 75 formed at the junction between the first and second portions 74, 76 blocks slidable movement of the valve sleeve 70 towards the left in FIG. 2 by contact with the interlock balls 72. This blocking prevents further movement of the valve sleeve 70 in the forward direction toward the flange 16 of the front body member 10. Thus, the valve sleeve 70 is blocked from moving axially forward. It is to be appreciated that the first portion 74 defines a diameter sufficient to loosely hold the interlock balls 72 in place within the openings 28.

Preferably, a retaining means such as a stainless steel snap ring 80 or the like prevents removal of the installed sliding valve sleeve 70 from the backnut. Additionally, a resilient member, preferably a detent O-ring 82, is provided to hold the valve sleeve 70 in the engaged position as will be discussed later. The valve sleeve 70 also includes a valve sleeve conduit 84 which in the illustrated embodiment is an annular opening defined by a third portion 85 of the valve sleeve 70 and the outer surface of the backnut 40. Preferably, the valve sleeve 70 also includes suitable sealing members such as gaskets or O-rings 86 disposed in inside grooves 87 of the valve sleeve 70 on opposite sides of the valve sleeve conduit 84 for assuring fluid flow without leakage. These O-rings 86 also provide increased frictional sliding resistance to help hold the valve sleeve 70 in place axially relative to the remaining components of the subject coupler 1.

Figure 6A:
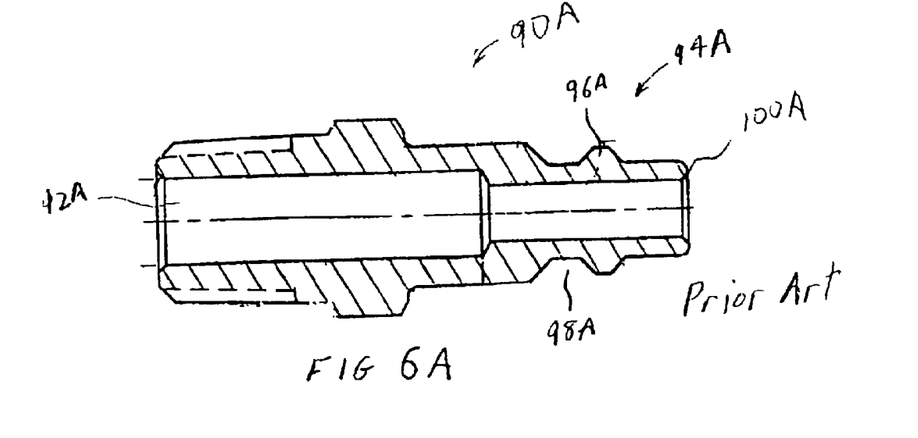
FIG. 6A is a cross-sectional view of a prior art industrial interchange-type plug which is compatible with the preferred embodiment of the coupler shown in FIGS. 2 through 5.
Figure 6B:
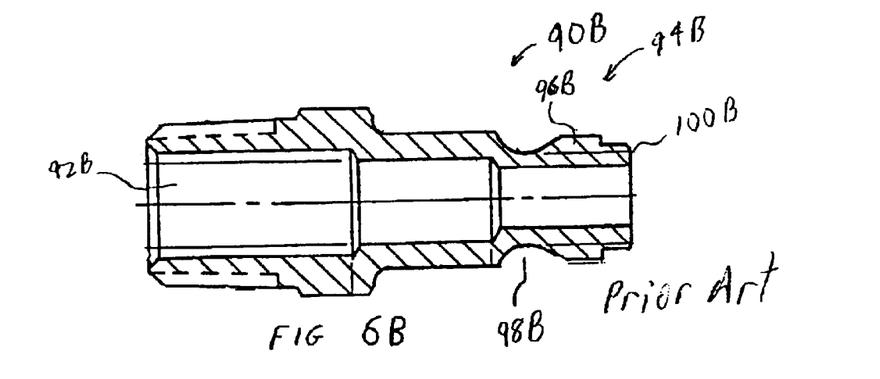
FIG. 6B is a cross-sectional view of a prior art True-Flate (Parker) type plug which is compatible with the preferred embodiment of the coupler shown in FIGS. 2 through 5.
Figure 6C:
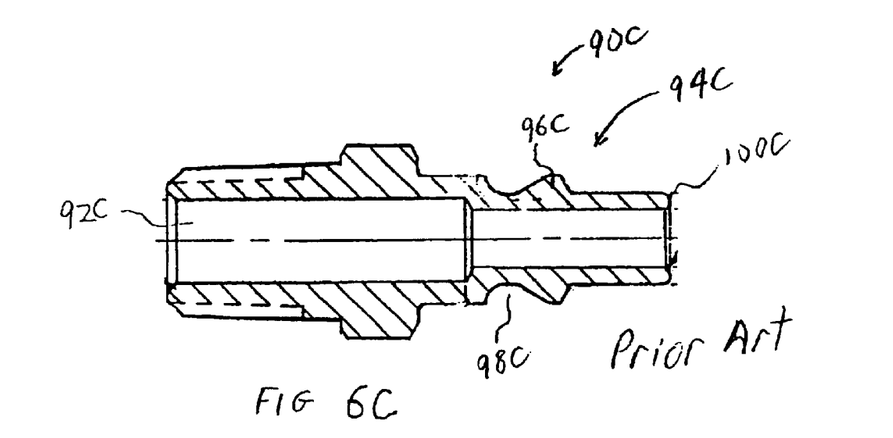
FIG. 6C is a cross-sectional view of a prior art ARO type plug which is compatible with the preferred embodiment of the coupler shown in FIGS. 2 through 5.

With reference now to FIGS. 6A–6C, the subject universal safety coupler 1 of FIGS. 2–5 is selectively intermateable with an associated male plug 90 to form a fluid connection coupling. The coupler 1 is universally applicable and is, therefore, mateable with a plurality of plug types. In the illustrated embodiment, the coupler 1 is compatible with at least three (3) standard plug configurations or plug types known to the art which are shown in FIGS. 6A–6C. An industrial interchange type plug 90A is shown in FIG. 6A. A Tru-Flate or Parker type plug 90B is shown in FIG. 6B. An ARO type plug 90C is shown in FIG. 6C. It will be appreciated that these plugs have important similarities. Each plug is essentially cylindrical in shape and is hollow to provide a fluid conduit. Each plug 90A, 90B, 90C has an outlet region 92A, 92B, 92C which is adapted to receive a hose, pipe, or other fluid conductor (not shown). In a preferred embodiment, the outlet region 92A, 92B, 92C is adapted to receive a ¼-inch hose. The connection preferably includes a standard threading arrangement, e.g. a ¼-18 NPTF female threading, although hose clamps, welds, or other connecting means are also contemplated.

With continuing reference to FIGS. 6A–6C, each plug 90A, 90B, 90C further has a mating region 94A, 94B, 94C disposed oppositely from the outlet region 92A, 92B, 92C. Each plug mating region 94A, 94B, 94C includes an annular projection 96A, 96B, 96C and an annular locking groove 98A, 98B, 98C arranged essentially adjacent to and inside of the annular projection 96A, 96B, 96C. However, the shape of the annular projection 96A, 96B, 96C, the length of a plug nose 10A, 10B, 100C of the plug, the diameter of the plug nose 10A, 10B, 100C, and the shape of the locking groove 98A, 98B, 98C vary somewhat between the plugs 90A, 90B, 90C. For example, the outer diameter of the plug noses 10A, 10B, 10C vary between about 0.31 inch and 0.36 inch.

Figure 7:
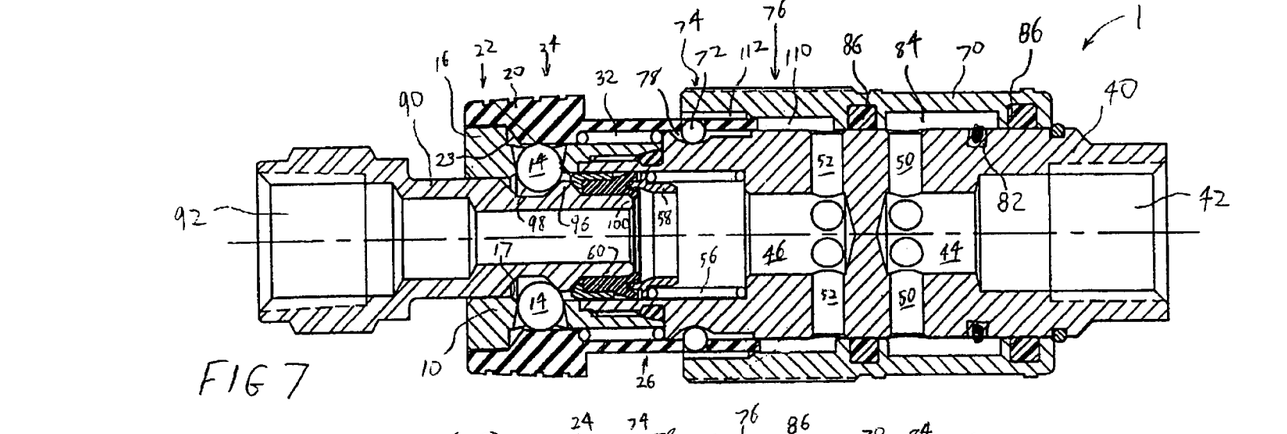
FIG. 7 is a cross-sectional view of a preferred embodiment of the subject coupler illustrated with a plug connected, but with the valve closed.
Figure 8:
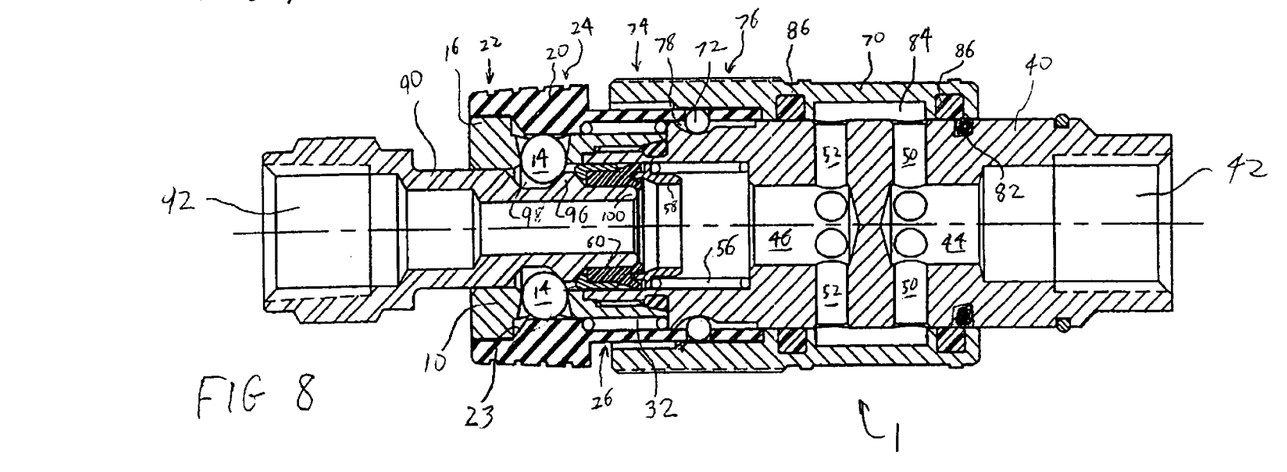
FIG. 8 is a cross-sectional view of the coupling of FIG. 7 with the valve open.

With particular reference now to FIGS. 2, 7, and 8, the mating of a representative generic plug 90 with the coupler 1 is described. FIG. 2 shows the coupler 1 without an inserted plug, it will be appreciated that the coupler 1 includes important safety features. Prior to plug insertion, the valve spring 56 biases the valve cap 62 fully forward against the surface 17 of the front body member 10. The valve cap 62 prevents radial inward movement of the locking balls 14, which in turn block the locking sleeve 20 from moving into its forwardmost position under the influence of the biasing sleeve spring 32. The blocked locking sleeve 20 cooperates with the interlock balls 72 and the surface 75 of the valve sleeve 70 to block the valve sleeve 70 from being moved forward. In the blocked position of the valve sleeve 70 shown in FIG. 2, it will be appreciated that the valve sleeve conduit 84 is operatively disconnected from the receiving valve conduits 52 so that fluid flow from the inlet region 42 of the backnut 40 is prevented.

It is thus seen that the valve cap 62, the valve spring 56, and the locking sleeve 20 cooperate with the locking balls 14 to form a latch interlock LI that maintains the lock L including the locking balls 14, the locking sleeve 20, and the sleeve spring 32 in an unlocked position responsive to the removal or absence of a plug from the receiving region formed by the hollow inner area of the front body member 10 and the valve assembly region 54.

Furthermore, it is to be appreciated that the locking sleeve 20 cooperates with the interlock balls 72 and the valve sleeve 70 to form a valve interlock VI including the valve sleeve 70 and inlet and receiving valve conduits 50, 52 along with sealing gaskets or O-rings 86. The valve interlock maintains the valve in its closed position responsive to an unlocked condition of the lock L. The illustrated preferred embodiment is exemplary only, and the latch interlock LI and valve interlock VI can take a variety of mechanical forms such as, for example, rollers, pins, cams or any form of locking dog without departing from the scope of the invention as set forth in the claims.

With continuing reference to FIG. 2 and with further reference now to FIG. 7, the mating of the plugs 90A, 90B,

90C with the universal coupler 1 is described. In FIG. 7, an exemplary plug 90 which is most similar to the industrial interchange type plug 90A is shown in mated position. The universal function U of the coupler 1 is provided by cooperation between the plug nose 100 and the valve cap 62, the valve seal 60, the seal carrier 58, and the valve spring 56. As the plug nose 100 is pressed into the valve assembly region 54, the valve cap 62, the valve seal 60 and the seal carrier 58 are urged away from the surface 17 against the force of the valve spring 56. The valve spring 56 thus accommodates variations in the length of the plug nose 100. Variations in the shape and/or diameter of the plug nose 100 are accommodated by the profile and corresponding deformation of the valve seal 60. Variations in the dimensions of the annular projection 96 and the locking groove 98 of the plug 90 are accommodated by movement of the locking balls 14 which can lock into a variety of groove shapes. By these mechanisms, at least the plug types 90A, 90B, 90C shown in FIGS. 6A–6C as well as others not shown are accommodated by the universal feature U of the coupler 1. Accordingly, the coupler 1 is a universal coupler.

It is to be appreciated that, although the preferred embodiment couples with three particular types of plugs illustrated in FIGS. 6A–6C, the invention is not so limited, but rather includes universal safety couplers that are compatible with multiple plug types, the variation in size and shape of the plug being accommodated by appropriate modifications to the particular shape and dimensions of the valve cap 62, the valve seal 60, the seal carrier 58, the valve spring 56, and et cetera. Such modifications are well within the ability of those of ordinary skill in the art.

As can be by comparing FIG. 2 with FIG. 7, as the plug nose urges the valve cap 62, valve seal 60, and seal carrier 58 back against the spring force, the locking balls 14 are freed from the outward surface of the valve cap 62. While this happens, the annular locking groove 98 of the plug 90 moves into the coupler 1 and overlaps the openings 12 so that the locking balls 14 can engage the locking groove 98 of the plug 90. It will be appreciated that the angle or bias of the surface 23 of the locking sleeve 20 further acts to push the locking balls 14 into the locking groove 98 under the influence of the sleeve spring 32. As seen in FIG. 7, with the locking balls engaged in the locking groove 98 of the plug 90, the locking sleeve 20 is unblocked and therefore moves forward under the sleeve spring 32 bias until the surface 23 abuts the flange 16 of the front body member 10. The second section 24 of the locking sleeve 20 surrounds the openings 12 and locks the locking balls 14 into the annular locking groove 98 of the plug 90. Thus, in the configuration shown in FIG. 7, the plug 90 is fully engaged and locked into the coupler 1.

It will be appreciated that the engaging and locking of the plug 90 into the coupler 1 requires merely that the user manually push the two components theretogether. The movement of the locking balls 14 and the locking sleeve 20 occurs due to the influence of the sleeve spring 32 in response to the displacement of the valve cap 62 by the plug 90. It is further to be appreciated that a number of variations in the mechanical design of the lock L can be made. For example, the valve spring 56 can be replaced by a threaded locking sleeve design in which the locking action would require a manual rotating of the locking sleeve. The locking balls 14 can be replaced by rollers, pins, cams, lock dogs, or the like. In yet another variation, the locking balls 14 are replaced by an annular ring. By tilting the annular ring, e.g. using a push button, its effective diameter is reduced in a direction transverse the tilt axis, thereby engaging the annular locking groove 98 of the plug 90. It is intended that all such variations fall within the scope of the invention insofar as they come within the scope of the claims or equivalents thereof.

It is seen that the locking sleeve 20, the sleeve spring 32, and the locking balls 14 cooperate to form a lock L that cooperates with at least the locking groove 98 to selectively lock the plug 90 into the receiving region. Additionally, the valve cap 62, the valve spring 56, and the locking sleeve 20 that cooperate with the locking balls 14 to form the latch interlock LI disengages responsive to insertion of the plug 90 into the receiving region. Once disengaged, the inserted plug 90 is selectively lockable. However, in the preferred embodiment the lock L is an automatic lock that locks the plug 90 into the receiving region responsive to insertion of the plug into the receiving region. The automatic locking is achieved through the spring biasing of the sleeve spring 32 in the preferred embodiment. As noted above, the lock L can take a range of mechanical forms, and can operate in either an automatic or a manual manner, without departing from the scope of the invention as set forth in the claims.

It will be further appreciated that the valve sleeve 70 position illustrated in FIG. 7 blocks the fluid flow, i.e. the valve V is closed. However, the forward movement of the locking sleeve 20 moves the interlock balls 72 forward and coincident with an annular receiving groove 78 of the backnut 40. Thus, the interlock balls 72 no longer block movement of the valve sleeve 70 in the configuration of FIG. 7. Thus, locking of the plug 90 into the coupler 1 is assured prior to movement of the valve sleeve 70 by the valve interlock VI including the valve sleeve 70, the interlock balls 72, and the locking sleeve 20.

With continuing reference to FIG. 7 and with further reference now to FIG. 8, the valve sleeve 70 is manually slid into the position shown in FIG. 8. Preferably, the O-ring 86 cooperates with the detent O-ring 82 to lock the valve sleeve 70 in the engaged position as shown in FIG. 8. With the sliding valve sleeve 70 in the engaged position, a continuous fluid flow path exists from the inlet region 42 of the backnut 40 to the outlet region 92 of the plug 90. In the engaged position of the sliding valve sleeve 70, e.g. the position shown in FIG. 8, the valve sleeve conduit 84 overlaps both the inlet valve conduits 50 and the receiving valve conduits 52 whereby a continuous fluid flow path is defined. The fluid flow path extends from the inlet region 42 of the backnut 40 into the inlet fluid conduit 44, through the inlet valve conduits 50, across the valve sleeve conduit 84, through the receiving valve conduits 52, into the receiving fluid conduit 46 and the valve assembly region 54 of the backnut 40, and lastly into the hollow fluid conducting main body 10. Thus, in the preferred embodiment, the valve V is formed by the valve sleeve 70 and inlet and receiving valve conduits 50, 52 in an open position as illustrated in FIG. 8 wherein fluid flows from the pressurized inlet 42 to the receiving region and the plug 90.

It is to be appreciated that many variations in the mechanical design of the valve V can be made. For example, the illustrated valve sleeve-based valve can be formed by providing an equivalent ball valve, butterfly valve, or the like. Similarly, the valve interlock VI can take the form of a camming mechanism, push button mechanism, locking dogs, or the like. It is intended that all such variations fall within the scope of the invention insofar as they come within the scope of the claims or equivalents thereof.

To disengage the plug 90 from the universal safety coupler 1, the mating steps are essentially reversed. The valve sleeve 70 is first manually withdrawn into the disengaged position. In the disengaged valve sleeve 70 position, e.g. the closed valve V position shown in FIG. 7, the receiving valve conduits 52 are operatively disconnected from the valve sleeve conduit 84 and the flow path is interrupted. However, the plug 90 remains locked.

FIG. 7 shows the coupling with the valve sleeve 70 moved into the disengaged position, but with the plug 90 in place and locked. It will be appreciated that in this position, the continuous fluid flow path is interrupted, as discussed previously. The inlet flow path begins at the inlet region 42 and passes through the inlet fluid conduit 44 and the inlet valve conduits 50 and terminates at the valve sleeve conduit 84, which is sealed by the O-rings 86.

On the outlet side, the receiving fluid conduit 46 provides the vent path VP to atmosphere via the receiving valve conduits 52 through gaps 110, 112 between the first and second portions 74, 76 of the valve sleeve 70, the third section 26 of the locking sleeve 20, and the outside of the backnut 40. It will be appreciated that no O-rings or other sealing members are present in this region to seal against such venting. Thus, the vent path VP selectively vents the receiving region in response to the closing of the valve. However, the gaps 110, 112 preferably have relatively low fluid conductances so that the downstream pressure is vented at a selected desired rate.

It will be appreciated that, since the user is holding the coupler at the valve sleeve 70, the vent path is away from the user's hand, i.e. the working fluid is not vented into the user's hand. It will also be appreciated that in the preferred embodiment the vent path VP is operatively connected with the valve V through the valve sleeve 70, insofar as moving the valve sleeve 70 into the engaged position opens the valve V while closing the vent path VP, whereas moving the valve sleeve 70 into the disengaged position closes the valve V while opening the vent path VP to allow venting.

After venting is completed, the plug 90 can be unlocked by manually pulling the locking sleeve 20 back against the force of the sleeve spring 32, whereby the locking balls 14 are freed to go into the space provided by the first section 22 of the locking sleeve 20 and the plug is withdrawn. As the plug is withdrawn, the valve spring 56 pushes the valve cap 62 back into its forwardmost position as shown in FIG. 2 thereby partially blocking the locking balls 14. These events re-engage the latch interlock LI and maintain the lock L in an unlocked condition responsive to the removal of the plug 90. Because the valve interlock VI maintains the valve V in its closed position responsive to an unlocked condition of the lock L, it follows that the engagement of the latch interlock LI assures engagement of the valve interlock VI in turn, and thus the latch interlock LI and the valve interlock VI cooperate to assure a closed position of the valve V in the absence of an inserted plug.

In addition to the controlled venting of the outlet side as described above, the universal safety coupler 1 includes additional safety features of significance during the uncoupling. It will be noticed that in the fully locked and engaged position illustrated in FIG. 8, the second portion 76 of the sliding valve sleeve 70 surrounds the interlock balls 72. Because of the reduced diameter of the second portion 76, the interlock balls are held firmly in the annular receiving groove 78 of the backnut 40. This prevents the locking sleeve 20 from being withdrawn without first withdrawing the valve sleeve 70 and thereby interrupting the inlet flow and venting the downstream outlet region as described previously. Thus, the valve sleeve 70, the interlock balls 72, and the groove 78 cooperate with the locking sleeve 20 to form the plug interlock PI that prevents withdrawal of the plug while the valve is open by maintaining the lock L in its locked position responsive to an open condition of the valve V. The plug interlock PI can take a range of mechanical forms beyond the illustrated preferred embodiment without departing from the scope of the invention as set forth in the claims.

Additionally, after the plug 90 is removed and the coupler 1 is returned to the configuration shown in FIG. 2, the valve sleeve 70 is blocked into the disengaged position through the cooperation of the valve cap 62, locking balls 14, locking sleeve 20 and interlock balls 72, as discussed previously. Thus, inadvertent re-engagement of the fluid flow from the inlet without first inserting and locking a plug is prevented. This safety feature corresponds to the valve interlock VI as discussed previously.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A coupler for coupling an inlet with an associated plurality of differently shaped plugs, each of said plugs having a locking groove, the coupler comprising:

a universal receiving region including moveable members for adapting the receiving region to receive the associated plurality of differently shaped plugs;

a lock cooperative with the locking grooves of said plurality of associated plugs to selectively lock a selected plug into the receiving region; and a valve moveable between an open position wherein fluid flows from the inlet to the receiving region and a closed position wherein the inlet is isolated from the receiving region, said movable members maintaining the lock in an unlocked condition responsive to removal of a plug from the receiving region.

2. The coupler as set forth in claim 1, further comprising:

a valve interlock that maintains the valve in its closed position responsive to an unlocked condition of the lock.

3. The coupler as set forth in claim 1, further comprising:

a vent path arranged to selectively vent the receiving region in response to a closing of the valve.

4. The coupler as set forth in claim 1, wherein the receiving region includes a pliant valve seal that essentially conforms to the shape of the plug nose whereby the receiving region adapts to the shapes of the plurality of plug types.

5. A coupler for coupling an inlet with an associated plug, the coupler comprising:

a receiving region adapted for selective connection with the nose portions of each plug of a plurality of differently shaped associated plugs, wherein said receiving region includes a resilient valve seal adapted to seal against nose portions of each plug of said plurality of associated plugs, and a valve spring biasing the valve seal against the nose portion of the plug selectively received in said receiving region whereby a predetermined range of plug nose lengths are accommodated;

a lock cooperative with locking grooves found in each of said plurality of associated plugs to selectively lock the plugs into the receiving region;

a valve moveable between an open position wherein fluid flows from the inlet to the receiving region and a closed position wherein the inlet is isolated from the receiving region; and, an interlock that cooperates with said lock and said valve whereby the valve is prevented from moving to said open position when an associated plug is not selectively locked in said receiving region by said lock.

6. The coupler as set forth in claim 5, further comprising:
a valve interlock that maintains the valve in its closed position responsive to an unlock condition of said lock.

7. The coupler as set forth in claim 5, further comprising:
a latch interlock that maintains the lock in an unlocked condition responsive to removal of a plug from the receiving region, said latch interlock disengaging responsive to insertion of a plug into the receiving region whereby the inserted plug is selectively lockable.

8. The coupler as set forth in claim 5, further comprising:
a vent path arranged to selectively vent the receiving region in response to a closing of the valve.

9. A universal safety coupler comprising:
a receiving region including moveable members for adapting the receiving region to receive a plurality of differently shaped associated plugs, each of said associated plugs having a locking groove;

a lock operable between a locked condition and an unlocked condition and being cooperative with the locking grooves of said plurality of associated plugs to selectively lock the plug into the receiving region when the lock is in the locked condition;

a valve moveable between an open position wherein fluid flows from the inlet to the receiving region and a closed position wherein the inlet is isolated from the receiving region;

a latch interlock that maintains the lock in an unlocked condition prior to insertion of a plug into the receiving region; and, a vent path arranged to selectively vent the receiving region in response to a closing of the valve.

10. The coupler as set forth in claim 9, further comprising:
a valve interlock that maintains the valve in its closed position responsive to said unlocked condition of the lock.

11. The coupler as set forth in claim 9, wherein the receiving region includes a pliant valve seal adapted to conform to the shape whereby the receiving region adapts to the shapes of the plurality of plug types.

12. A coupler for coupling an inlet with an associated plug, the coupler comprising:
a receiving region adapted for selective connection with nose portions of each plug of a plurality of differently shaped associated plugs, wherein said receiving region includes a resilient valve seal adapted to seal against the nose portions of each plug of said associated plugs, and a valve spring biasing the valve seal and the valve against the nose portion of the associated plug selectively received in said receiving region whereby a predetermined range of plug nose lengths are accommodated;

a lock cooperative with the locking groove to selectively lock the plug into the receiving region;

a valve moveable between an open position wherein fluid flows from the inlet to the receiving region and a closed position wherein the inlet is isolated from the receiving region; and, a valve interlock that maintains the valve in its closed position responsive to an unlock condition of said lock.

13. A coupler for coupling an inlet with an associated plug, the coupler comprising:
a receiving region adapted for selective connection with associated nose portions of each plug of a plurality of differently shaped plugs, wherein said receiving region includes a resilient valve seal adapted to seal against the nose portions of each plug of said associated plugs, and a valve spring biasing the valve seal and the valve against the nose portion of the associated plug selectively received in said receiving region whereby a predetermined range of plug nose lengths are accommodated;

a lock cooperative with the locking groove to selectively lock the plug into the receiving region;

a valve moveable between an open position wherein fluid flows from the inlet to the receiving region and a closed position wherein the inlet is isolated from the receiving region; and, a latch interlock that maintains the lock in an unlocked condition responsive to removal of a plug from the receiving region, said latch interlock disengaging responsive to insertion of a plug into the receiving region whereby the inserted plug is selectively lockable.

14. A coupler for coupling an inlet with an associated plug, the coupler comprising:
a receiving region adapted for selective connection with associated nose portions of each plug of a plurality of differently shaped plugs, wherein said receiving region includes a resilient valve seal adapted to seal against the nose portions of each plug of said associated plugs, and a valve spring biasing the valve seal and the valve against the nose portion of the plug selectively received in said receiving region whereby a predetermined range of plug nose lengths are accommodated;

a lock cooperative with the locking groove to selectively lock the plug into the receiving region;

a valve moveable between an open position wherein fluid flows from the inlet to the receiving region and a closed position wherein the inlet is isolated from the receiving region; and, a vent path arranged to selectively vent the receiving region in response to a closing of the valve.

* * * * *